US012449928B2

(12) United States Patent
Fang

(10) Patent No.: US 12,449,928 B2
(45) Date of Patent: Oct. 21, 2025

(54) SELF-CAPACITANCE TOUCH PANEL

(71) Applicants: Wuhan China Star Optoelectronics Technology Co., Ltd., Wuhan (CN); Wuhan China Star Optoelectronics Semiconductor Display Technology Co., Ltd., Wuhan (CN)

(72) Inventor: Liang Fang, Wuhan (CN)

(73) Assignees: Wuhan China Star Optoelectronics Technology Co., Ltd, Wuhan (CN); Wuhan China Star Optoelectronics Semiconductor Display Technology Co., Ltd, Wuhan (CN)

(*) Notice: Subject to any disclaimer, the term of this patent is extended or adjusted under 35 U.S.C. 154(b) by 0 days.

(21) Appl. No.: 17/613,552

(22) PCT Filed: Nov. 5, 2021

(86) PCT No.: PCT/CN2021/129067
§ 371 (c)(1),
(2) Date: Nov. 23, 2021

(87) PCT Pub. No.: WO2023/070733
PCT Pub. Date: May 4, 2023

(65) Prior Publication Data
US 2024/0264694 A1 Aug. 8, 2024

(30) Foreign Application Priority Data

Oct. 25, 2021 (CN) .......................... 202111238108.0

(51) Int. Cl.
G06F 3/041 (2006.01)
G06F 3/044 (2006.01)

(52) U.S. Cl.
CPC ........ *G06F 3/04164* (2019.05); *G06F 3/0418* (2013.01); *G06F 3/0443* (2019.05); *G06F 3/04166* (2019.05); *G06F 2203/04107* (2013.01)

(58) Field of Classification Search
CPC .. G06F 3/04164; G06F 3/0418; G06F 3/0443; G06F 3/04166; G06F 2203/04107
See application file for complete search history.

(56) References Cited

U.S. PATENT DOCUMENTS 11,392,234 B2 * 7/2022 Lee ..................... G06F 3/0443
11,444,136 B2 * 9/2022 Kim ..................... G09F 9/301
(Continued)

FOREIGN PATENT DOCUMENTS

CN 102200866 A 9/2011
CN 105760026 A 7/2016
(Continued)

OTHER PUBLICATIONS

International Search Report in International application No. PCT/CN2021/129067, mailed on Jul. 19, 2022.
(Continued)

*Primary Examiner* — Bryan Earles
(74) *Attorney, Agent, or Firm* — Nathan & Associates; Menachem Nathan

(57) ABSTRACT

The present application provides a self-capacitance touch panel, a signal shielding line is disposed between a plurality of touch signal lines connected to each column of touch electrodes and two columns of the touch electrodes adjacent to the each column of touch electrodes. With the signal shielding line, an interference of each column of the touch electrodes and their connected touch signal lines from two adjacent columns of the touch electrodes and their connected touch signal lines is reduced, so as to make a touch moni-
(Continued)

toring of a column of the touch electrodes being scanned more accurate.

11 Claims, 13 Drawing Sheets

(56) References Cited

U.S. PATENT DOCUMENTS

| | | | |
|---|---|---|---|
| 2010/0194707 A1* | 8/2010 | Hotelling | G06F 3/041 |
| | | | 345/55 |
| 2014/0247247 A1* | 9/2014 | Hotelling | G06F 3/017 |
| | | | 345/174 |
| 2015/0084888 A1* | 3/2015 | Han | G06F 3/0412 |
| | | | 345/173 |
| 2017/0031480 A1* | 2/2017 | Gabriel | F24C 7/086 |
| 2017/0192614 A1 | 7/2017 | Lee et al. | |
| 2019/0079623 A1* | 3/2019 | Kim | G09G 3/2096 |
| 2019/0102010 A1* | 4/2019 | Knabenshue | G06F 3/0442 |
| 2019/0102011 A1* | 4/2019 | Schultz | G06F 3/04164 |
| 2019/0286261 A1* | 9/2019 | Neel | G01D 5/24 |
| 2023/0180574 A1* | 6/2023 | Yu | G06F 3/0443 |

FOREIGN PATENT DOCUMENTS

| | | |
|---|---|---|
| CN | 106293206 A | 1/2017 |
| CN | 210534741 U | 5/2020 |
| CN | 112596631 A | 4/2021 |
| CN | 213904304 U | 8/2021 |
| CN | 113515207 A | 10/2021 |
| WO | 2017028492 A1 | 2/2017 |

OTHER PUBLICATIONS

Written Opinion of the International Search Authority in International application No. PCT/CN2021/129067, mailed on Jul. 19, 2022.
Chinese Office Action issued in corresponding Chinese Patent Application No. 202111238108.0 dated Apr. 27, 2023, pp. 1-5.
Chinese Office Action issued in corresponding Chinese Patent Application No. 202111238108.0 dated Sep. 3, 2023, pp. 1-6.

* cited by examiner

SELF-CAPACITANCE TOUCH PANEL

BACKGROUND OF DISCLOSURE

1. Field of Disclosure

The embodiments of the present application relate to a field of display technology, and in particular to a self-capacitance touch panel.

2. Description of Related Art

Projected capacitive touch screens include self-capacitance touch screens and mutual-capacitance touch screens, wherein indium tin oxide (ITO) transparent conductive material is used on glass surface to make horizontal and vertical touch electrode arrays. If the horizontal touch electrodes and the vertical touch electrodes respectively form a capacitance with ground, it is called self capacitance. When a finger touches the touch screen, capacitance of the finger will be superimposed on the self capacitance, making the self capacitance larger, so that a touch point can be determined by the self capacitance. If the horizontal touch electrodes cross the vertical touch electrodes, a capacitance will be formed, and it is called mutual capacitance. When the finger touches the touch screen, the mutual capacitance decreases. When detecting the mutual capacitance, the horizontal touch electrodes sequentially send out excitation signals, and all vertical touch electrodes receive signals at the same time, so that a capacitance value of an intersection of all horizontal touch electrodes and vertical touch electrodes can be obtained, and the touch point can be determined. At present, the self-capacitance touch screens are much less difficult than the mutual-capacitance touch screens in terms of conductive layer planning, wiring, or algorithm. Therefore, the self-capacitance touch screens still have own advantages.

At present, to prevent ghost points and realize multi-touch, self-capacitive touch screens mostly use a one-to-one connection between touch electrodes 10 and touch signal lines 20, as shown in FIG. 1. Each touch electrode 10 needs to lead out a touch signal line 20, and the touch signal line 20 corresponding to each row or each column of the touch electrodes 10 is disposed between a column of the touch electrodes 10 and adjacent rows or adjacent columns of the touch electrodes 10. For this self-capacitance touch screen, if each column of the touch electrodes 10 inputs a same driving signal at a same time, adjacent columns of the touch electrodes 10 will not interfere with each other. However, to reduce power consumption and prevent misdetection, a touch scanning process is generally to scan the touch electrodes 10 column by column (or a few columns) to determine the touch point, that is, it only needs to input the driving signal to one column of the touch electrodes 10 being scanned column by column and collect the touch signal. In this way, there is a potential difference between the column of the touch electrodes 10 being scanned and two adjacent columns of the touch electrodes 10, so two adjacent columns of the touch electrodes 10 will interfere with the column of touch electrodes 10 being scanned and its connected touch signal lines 20, which causes a touch monitoring of the column of touch electrodes 10 being scanned to be inaccurate, resulting in poor touch performance of the display panel. As shown in FIG. 1, if a second column of touch electrodes 10 is being scanned, a high-frequency driving signal is input to the second column of touch electrodes 10 through the touch signal lines 20 connected to the second column of touch electrodes 10. In this case, a first column of the touch electrodes 10 and a third column of the touch electrodes 10 are suspended, grounded or connected to other low-frequency driving signals, which will cause a potential difference between the touch signal lines 20 connected to the first column of touch electrodes 10 and the second column of touch electrodes 10, and will also cause a potential difference between the third column of touch electrodes 10 and the touch signal lines 20 connected to the second column of touch electrodes 10. Therefore, the touch signal lines 20 connected to the first column of touch electrodes 10 and the third column touch of electrodes 10 will interfere with the second column of touch electrodes 10 and the touch signal lines 20 connected thereto, so that touch performance of the second column of touch electrodes 10 is not accurate enough.

Therefore, there is an urgent need to propose a new self-capacitance touch panel to solve a problem that when scanning the touch electrodes column by column (or few columns), due to a different potential between one column of the touch electrodes being scanned and two adjacent columns of the touch electrodes, the two adjacent columns of the touch electrodes and their connected touch signal lines will cause interference with the column of touch electrodes being scanned and its connected touch signal lines, resulting in that the touch monitoring of the column of touch electrodes being scanned is not accurate enough.

3. Technical Problem

When a current touch panel scans the touch electrodes column by column (or few columns), due to different potential between one column of the touch electrodes being scanned and two adjacent columns of the touch electrodes, the two adjacent columns of the touch electrodes and their connected touch signal lines will cause interference with the column of the touch electrodes being scanned and its connected touch signal lines, resulting in a problem that a touch monitoring of the column of the touch electrodes being scanned is not accurate enough.

SUMMARY

To solve above problems, the present application provides a self-capacitance touch panel. The self-capacitance touch panel includes a touch area and a peripheral area surrounding the touch area, the peripheral area is disposed with a touch integrated circuit, and the touch area is disposed with touch electrodes arranged in an array, each of the touch electrodes is connected to the touch integrated circuit through a single touch signal line. The self-capacitance touch panel also includes a plurality of signal shielding lines, and the signal shielding line is disposed between a plurality of touch signal lines connected to each column of the touch electrodes and two columns of the touch electrodes adjacent to the each column of the touch electrodes.

In some embodiments, the signal shielding line is connected to the touch integrated circuit, and the touch integrated circuit is used to input a first driving signal to the touch signal line and input a second driving signal to the signal shielding line, wherein a potential difference between the first driving signal and the second driving signal is less than a default threshold.

In some embodiments, the signal shielding line is also disposed in the peripheral area or in the touch area close to the peripheral area, a plurality of the signal shielding lines are connected to each other at one end away from the touch integrated circuit, and the signal shielding line disposed in the peripheral area or in the touch area close to the peripheral area is connected to the touch integrated circuit.

In some embodiments, a plurality of the signal shielding lines are connected to each other at one end close to the touch integrated circuit and are connected to the touch integrated circuit through leads located in the peripheral area, wherein the signal shielding line is connected by changing wires at an intersection with the touch signal line.

In some embodiments, the peripheral area further comprises a bending area, and the signal shielding line is connected to the touch integrated circuit after the bending area is bent.

In some embodiments, the signal shielding line is a single-layer shielding line, and the touch electrode, the touch signal line and the signal shielding line are disposed in a same layer.

In some embodiments, the signal shielding line is a multilayer shielding line, and two adjacent layers of the multilayer shielding line are connected by via holes.

In some embodiments, the touch electrodes and the touch signal lines are disposed in a same layer, and one layer of the signal shielding lines is disposed in the same layer as the touch electrodes and the touch signal lines.

In some embodiments, the touch electrodes and the touch signal lines are arranged in different layers, and one layer of the signal shielding line is disposed in a same layer as the touch electrodes, and another layer of the signal shielding line is disposed in a same layer as the touch signal lines.

In some embodiments, the signal shielding line is made of one or a combination of gold, silver, copper, molybdenum, aluminum, and indium tin oxide.

In addition, the embodiment of the present application also provides a self-capacitance touch panel, including a touch area and a peripheral area surrounding the touch area, the peripheral area is disposed with a touch integrated circuit, and the touch area is disposed with touch electrodes arranged in an array, each of the touch electrodes is connected to the touch integrated circuit through a single touch signal line; wherein, a plurality of signal shielding lines are also included, and the signal shielding line is disposed between a plurality of touch signal lines connected to each column of the touch electrodes and two columns of the touch electrodes adjacent to the each column of the touch electrodes, Where the signal shielding line is connected to the touch integrated circuit, and the touch integrated circuit is used to input a first driving signal to the touch signal line and input a second driving signal to the signal shielding line, wherein a potential difference between the first driving signal and the second driving signal is less than a default threshold.

In some embodiments, a plurality of the signal shielding lines are connected to each other at one end close to the touch integrated circuit and are connected to the touch integrated circuit through leads located in the peripheral area, wherein the signal shielding line is connected by changing wires at an intersection with the touch signal line.

In some embodiments, the signal shielding line is also disposed in the peripheral area or in the touch area close to the peripheral area, a plurality of the signal shielding lines are connected to each other at one end away from the touch integrated circuit, and the signal shielding line disposed in the peripheral area or in the touch area close to the peripheral area is connected to the touch integrated circuit.

In some embodiments, the peripheral area further comprises a bending area, and the signal shielding line is connected to the touch integrated circuit after the bending area is bent.

In some embodiments, the signal shielding line is a single-layer shielding line, and the touch electrode, the touch signal line and the signal shielding line are disposed in a same layer.

In some embodiments, the signal shielding line is a multilayer shielding line, and two adjacent layers of the multilayer shielding line are connected by via holes.

In some embodiments, the touch electrodes and the touch signal lines are disposed in a same layer, and one layer of the signal shielding lines is disposed in the same layer as the touch electrodes and the touch signal lines.

In some embodiments, the touch electrodes and the touch signal lines are arranged in different layers, and one layer of the signal shielding line is disposed in a same layer as the touch electrodes, and another layer of the signal shielding line is disposed in a same layer as the touch signal lines.

In some embodiments, the signal shielding line is made of one or a combination of gold, silver, copper, molybdenum, aluminum, and indium tin oxide.

Beneficial effect: In the self-capacitance touch panel provided by the embodiment of the present application, a signal shielding line is disposed between a plurality of touch signal lines connected to each column of touch electrodes and two columns of touch electrodes adjacent to the each column of touch electrodes. Using the signal shielding line to reduce an interference of each column of touch electrodes and their connected touch signal lines from the two adjacent columns of touch electrodes and their connected touch signal lines, so as to avoid a condition that when scanning the touch electrodes column by column, due to a potential difference existing between one column of touch electrodes being scanned and two adjacent columns of touch electrodes, the two adjacent columns of the touch electrodes and their connected touch signal lines will cause interference to the column of touch electrodes being scanned and its connected touch signal lines, resulting in that a touch monitoring of the column of touch electrodes being scanned is not accurate enough, which affects a touch performance of the self-capacitance touch panel.

DETAILED DESCRIPTION OF EMBODIMENTS

To make the purpose, technical solutions and effects of the present application clearer and more specific, the present application will be further described in detail below with reference to the accompanying drawings and embodiments. It should be understood that the specific embodiments described here are only used to explain the present application, and are not used to limit the present application.

Figure 1:
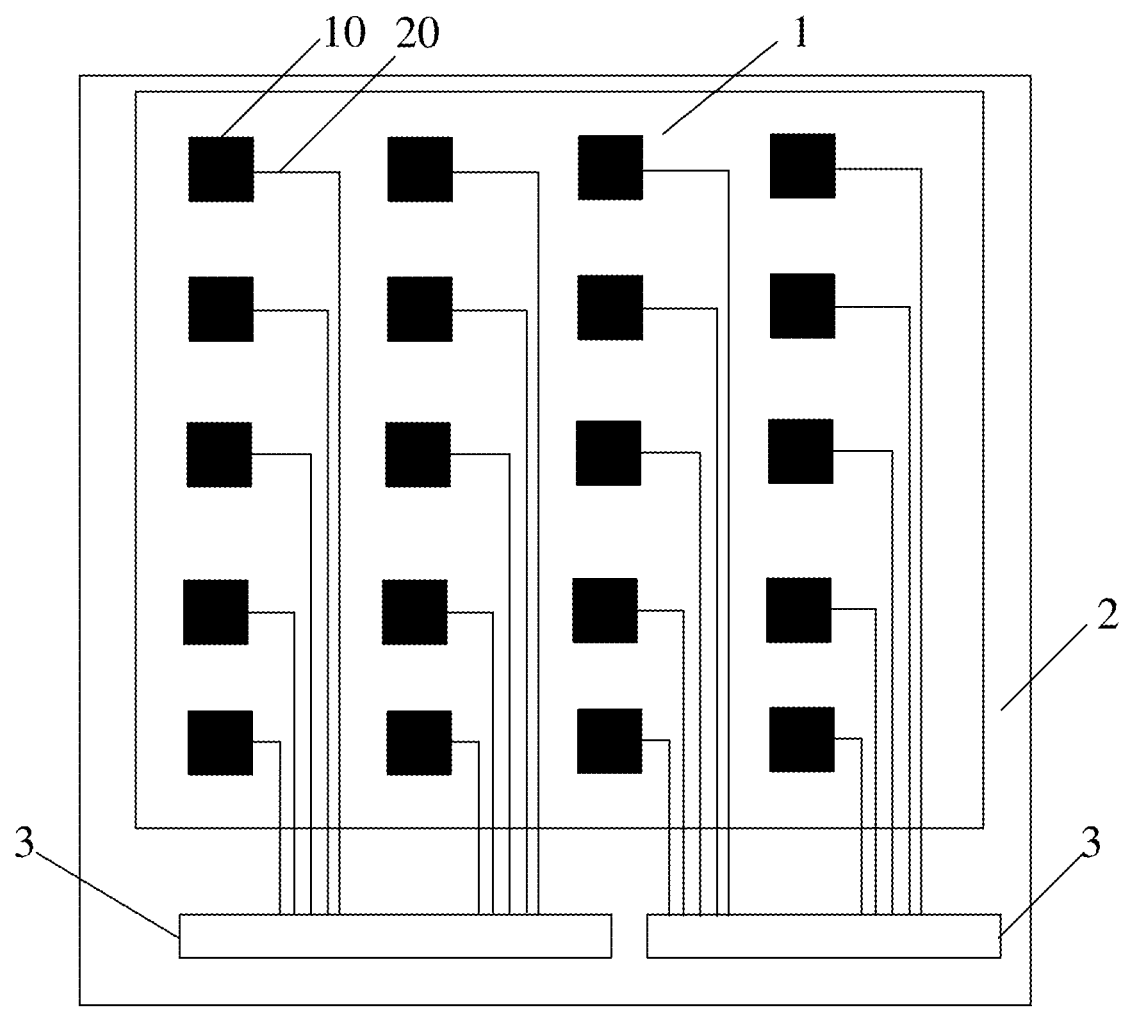
FIG. 1 is a schematic structural diagram of a self-capacitance touch panel in the prior art.
Figure 2:
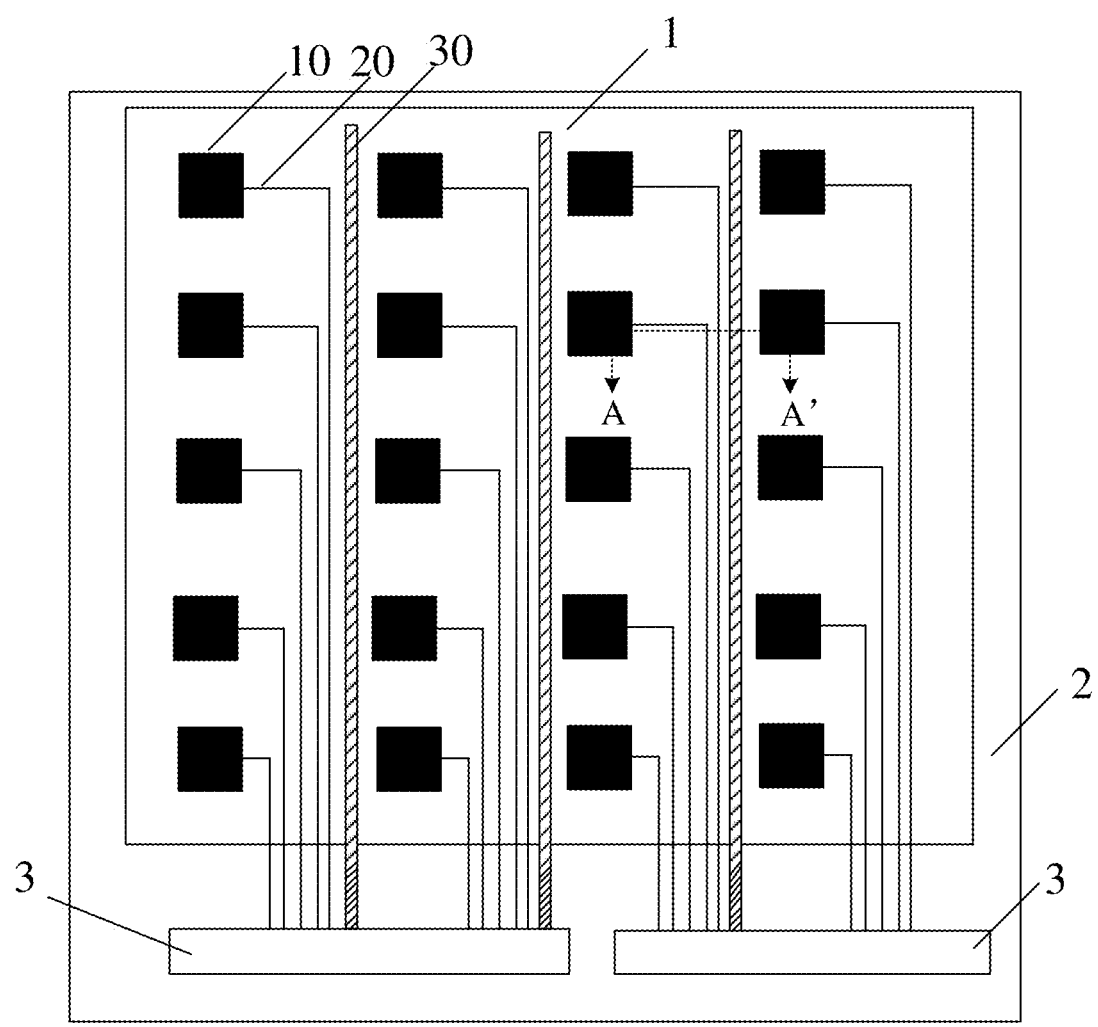
FIG. 2 is a schematic structural diagram of a self-capacitance touch panel provided by an embodiment of the present application.

FIG. 2 is a schematic structural diagram of a self-capacitance touch panel provided by an embodiment of the present application. As shown in FIG. 2, the self-capacitance touch panel includes a touch area 1 and a peripheral area 2 surrounding the touch area 1. The peripheral area 2 is disposed with a touch integrated circuit 3, and the touch area 1 is disposed with touch electrodes 10 arranged in an array, each of the touch electrodes 10 is grounded and connected to the touch integrated circuit 3 through a single touch signal line 20. The self-capacitance touch panel also includes a plurality of signal shielding lines 30, and the signal shielding line 30 is disposed between a plurality of touch signal lines 20 connected to each column of the touch electrodes 10 and two columns of the touch electrodes 10 adjacent to the each column of the touch electrodes 10.

Specifically, to avoid a condition that when scanning the touch electrodes 10 column by column, a potential difference exists between one column of the touch electrodes 10 being scanned and two adjacent columns of the touch electrodes 10, which causes the two adjacent columns of the touch electrodes 10 and their connected touch signal lines 20 to interfere with the column of touch electrodes 10 being scanned and its connected touch signal lines 20, resulting in that a touch monitoring of the column of touch electrodes 10 being scanned is not accurate enough, the self-capacitance touch panel provided by the embodiment of the present application is configured with a signal shielding line 30 between the touch signal lines 20 connected to each column of the touch electrodes 10 and two adjacent columns of the touch electrodes 10. As shown in FIG. 2, a signal shielding line 30 is disposed on a left and/or a right side of each column of touch electrodes 10, so that when the column of touch electrodes 10 is scanned, the signal shielding line 30 on the left and the right sides is used to shield the interference caused by left and right columns of touch electrodes 10 and the touch signal lines 20 connected thereto with the column of touch electrodes 10 and the touch signal lines 20 thereof.

In the self-capacitance touch panel provided by the embodiment of the present application, a signal shielding line is disposed between a plurality of touch signal lines connected to each column of the touch electrodes 10 and two columns of touch electrodes 10 adjacent to the each column of the touch electrodes. The signal shielding line is used to reduce an interference of each column of the touch electrodes and their connected touch signal lines from the two adjacent columns of the touch electrodes and their connected touch signal lines, so as to avoid a condition that when scanning the touch electrodes column by column, due to a potential difference existing between one column of the touch electrodes being scanned and two adjacent columns of the touch electrodes, the two adjacent columns of the touch electrodes and their connected touch signal lines will cause interference with the column of touch electrodes being scanned and its connected touch signal lines, resulting in that a touch monitoring of the column of touch electrodes being scanned is not accurate enough, thereby affecting touch performance of the self-capacitance touch panel.

Based on the above embodiment, the signal shielding line 30 is connected to the touch integrated circuit 3, so that the touch integrated circuit 3 is used to input a first driving signal to the touch signal line 20 and a second driving signal to the signal shielding line 30, wherein a potential difference between the first driving signal and the second driving signal is less than a default threshold.

Specifically, according to an induced charge formula between two conductors $Q=C\Delta U$, wherein Q is an induced charge, C is a capacitance between two conductors, and $\Delta U$ is a potential difference between two conductors, if the potential difference $\Delta U$ between the two conductors is 0, the induced charge Q between the two conductors is 0. Therefore, the smaller the potential difference between the first driving signal and the second driving signal, the less the touch electrodes 10 of two adjacent columns and the touch signal lines 20 connected thereto interfere with the column of touch electrodes 10 being scanned and the touch signal lines 20 connected thereto.

Ideally, to minimize the interference of the column of touch electrodes 10 being scanned by two adjacent columns of the touch electrodes 10, a column of touch signals being scanned and two adjacent columns of touch signals can be input a same driving signal synchronously. That is, the potential difference between the first driving signal and the second driving signal is 0, so that one column of touch electrodes 10 being scanned and its connected touch signal lines 20 are minimally interfered by the touch electrodes 10 of two adjacent columns and the touch signal lines 20 connected thereto.

For example, when scanning a second column of touch electrodes of in FIG. 2, a same driving signal is input to the touch signal lines connected to the second column of touch electrodes and two adjacent signal shielding lines of the second column of touch electrodes. Thereby, with the two adjacent signal shielding lines on the left and right of the second column of touch electrodes, it can prevent a first column of the touch electrodes and its connected touch signal lines and a third column of the touch electrodes and its connected touch signal lines from interfering with the second column of touch electrodes 10. The signal shielding line 30 can prevent the third column of touch electrodes 10 from interfering with a charging signal line 21 connected to the second column of touch electrodes 10. Similarly, other signal shielding lines can also play a same role, thereby improving a touch accuracy of an entire touch display panel.

It should be explained that the signal shielding line 30 can be connected to the touch integrated circuit 3 in a variety of ways.

As shown in FIG. 2, a first connection way of the signal shielding line 30 and the touch integrated circuit 3 is: each signal shielding line 30 extends to be connected to the touch integrated circuit 3 respectively.

Figure 3:
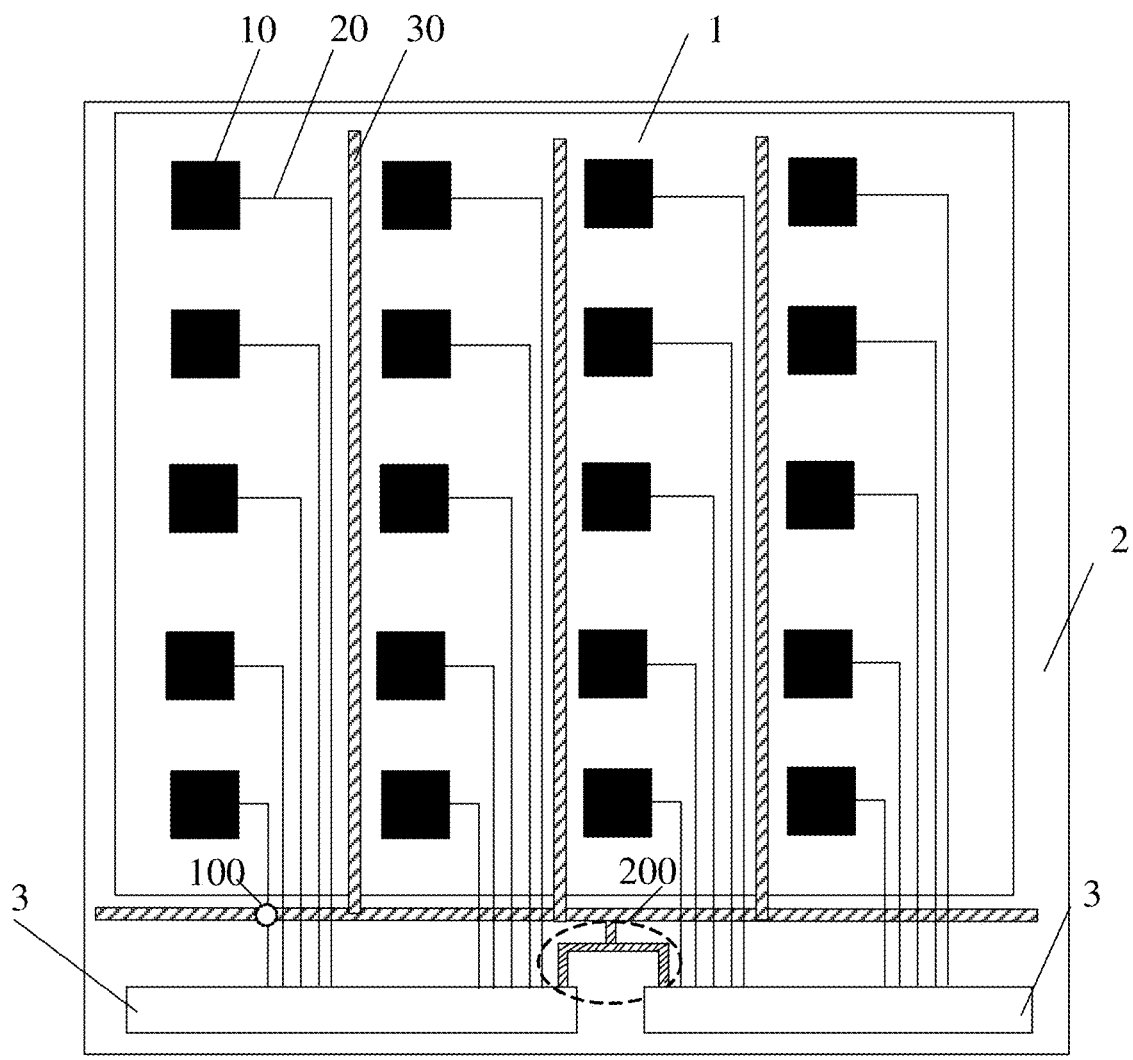
FIG. 3 is another schematic diagram of a connection between a signal shielding line of the self-capacitance touch panel and a touch integrated circuit provided by the embodiment of the present application.

As shown in FIG. 3, a second connection way of the signal shielding line 30 and the touch integrated circuit 3 is: a plurality of signal shielding lines 30 are connected to each other at one end close to the touch integrated circuit 3, and connecting lines and the signal shielding lines 30 are in a same layer. Since the signal shielding lines 30 intersect the touch signal lines 20 when it is connected to each other close to the touch integrated circuit 3, the signal shielding lines 30 need to be connected by changing wires at an intersection 100 of the signal shielding lines 30 and the touch signal lines 20. That is, the signal shielding lines 30 bypasses the touch signal lines 20 at the intersection with the touch signal lines 20 through a via hole, thereby preventing the signal shielding lines 30 from crossing the touch signal lines 20. In addition, to enable a plurality of signal shielding lines 30 to receive the driving signal of the touch integrated circuit 3 as soon as possible at the end close to the touch integrated circuit 3 for reducing IC loading, in the peripheral area 2, a plurality of signal shielding lines 30 may lead out leads 200 from the connecting lines of one end close to the touch integrated circuit 3, and the plurality of signal shielding lines 30 may be connected to the touch integrated circuit 3 through newly added leads 200 in the peripheral area 2.

Figure 4:
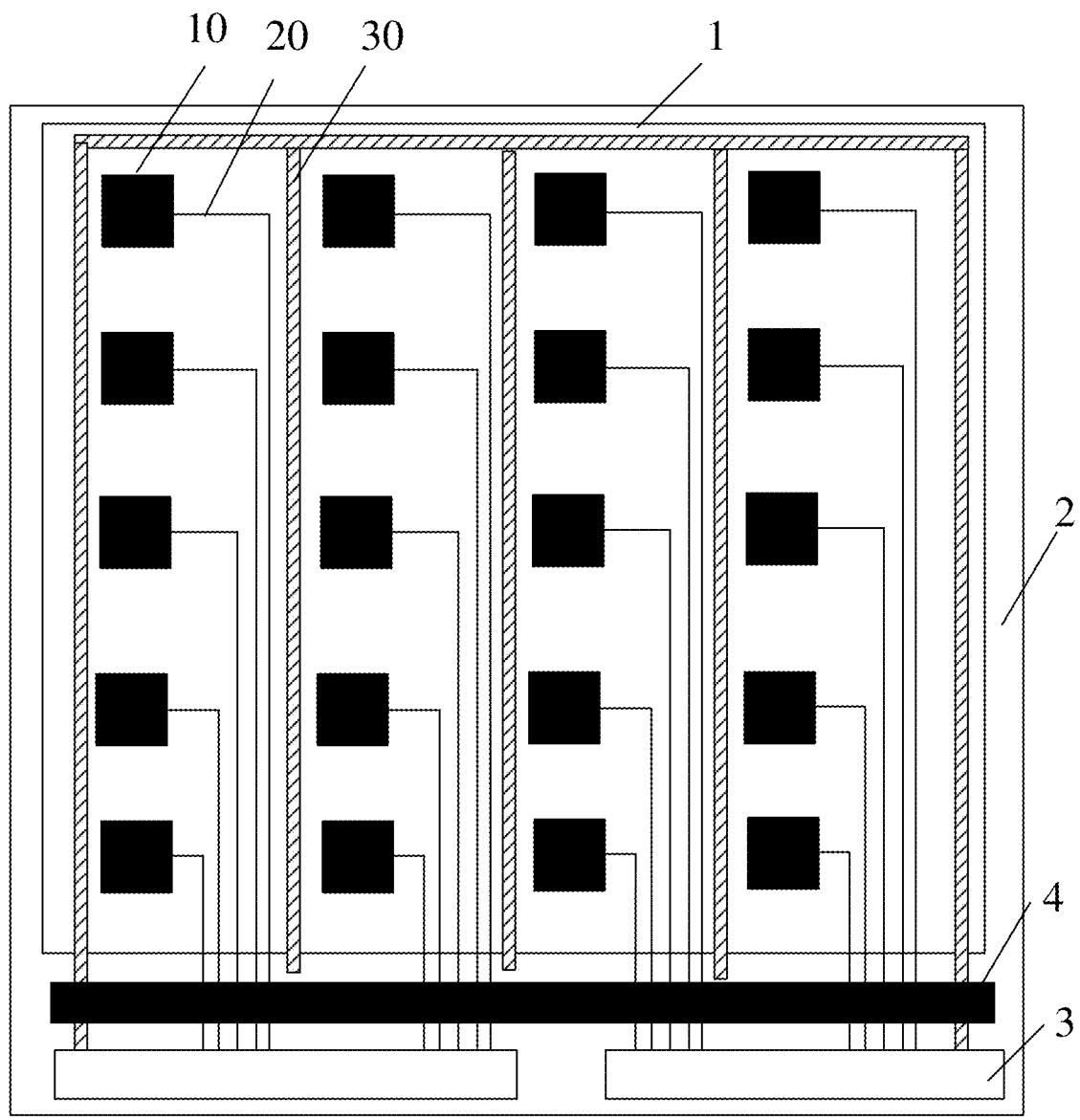
FIG. 4 is schematic diagram of another connection between the signal shielding line of the self-capacitance touch panel and the touch integrated circuit provided by the embodiment of the present application.
Figure 5:
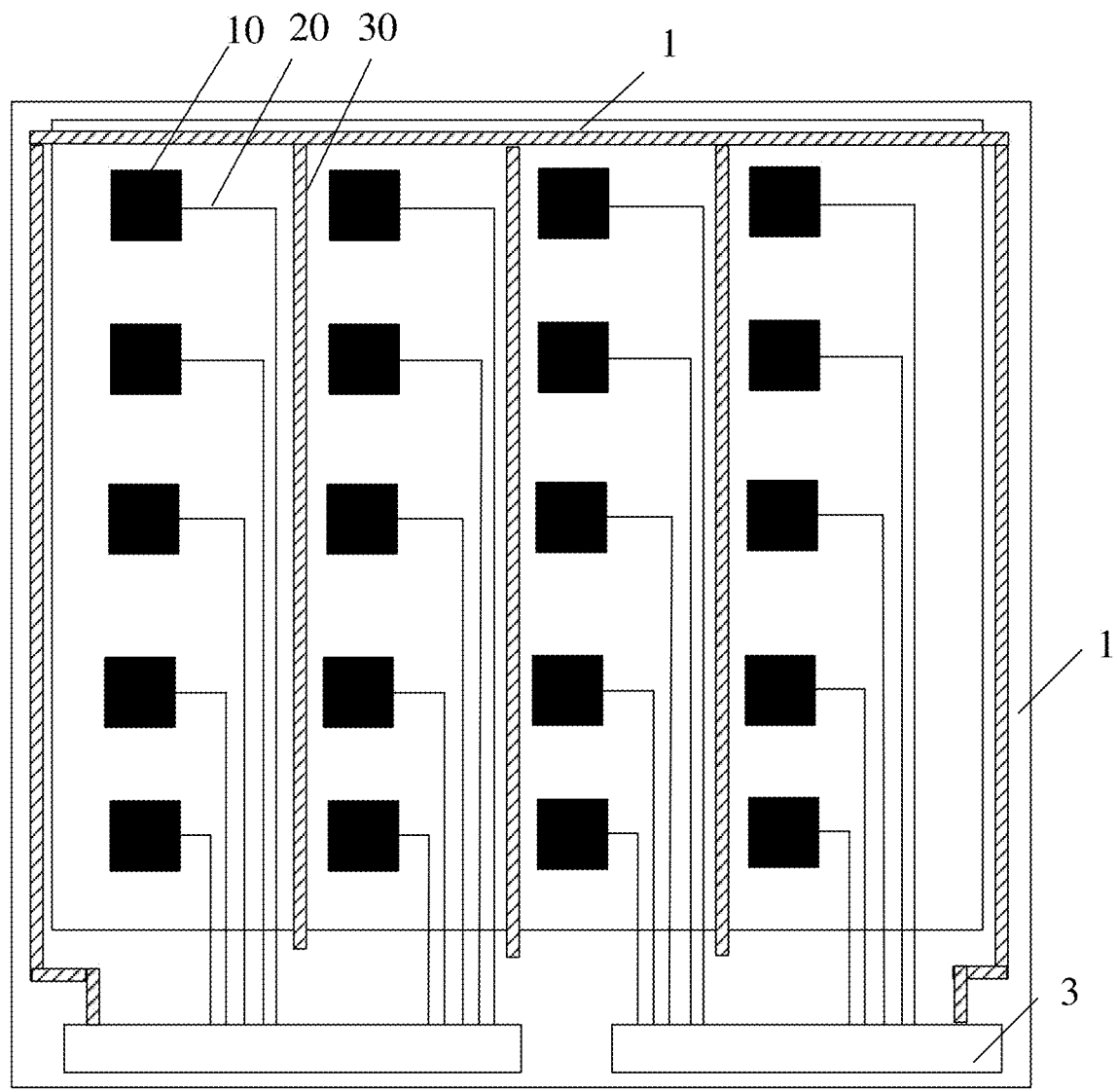
FIG. 5 is schematic diagram of yet another connection between the signal shielding line of the self-capacitance touch panel and the touch integrated circuit provided by the embodiment of the present application.
Figure 6A:
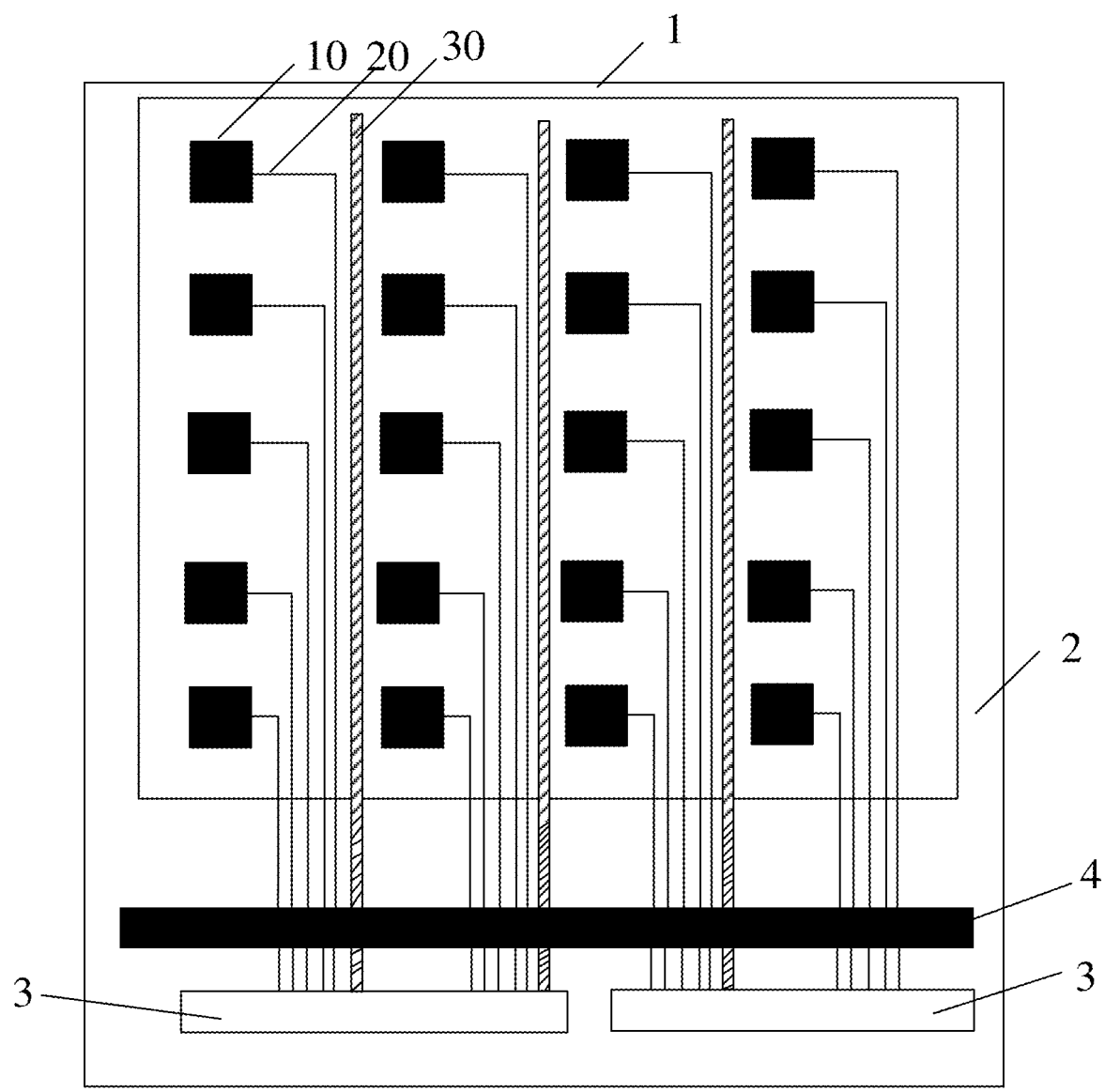
FIG. 6($a$) is a schematic structural diagram of a self-capacitance touch panel with a bending area corresponding to FIG. 2.
FIG. 6(b) is a schematic structural diagram of a self-capacitance touch panel with a bending area corresponding to FIG. 3.
FIG. 6(c) is a schematic structural diagram of a self-capacitance touch panel with a bending area corresponding to FIG. 4.
FIG. 6(d) is a schematic structural diagram of a self-capacitance touch panel with a bending area corresponding to FIG. 5.
Figure 6B:
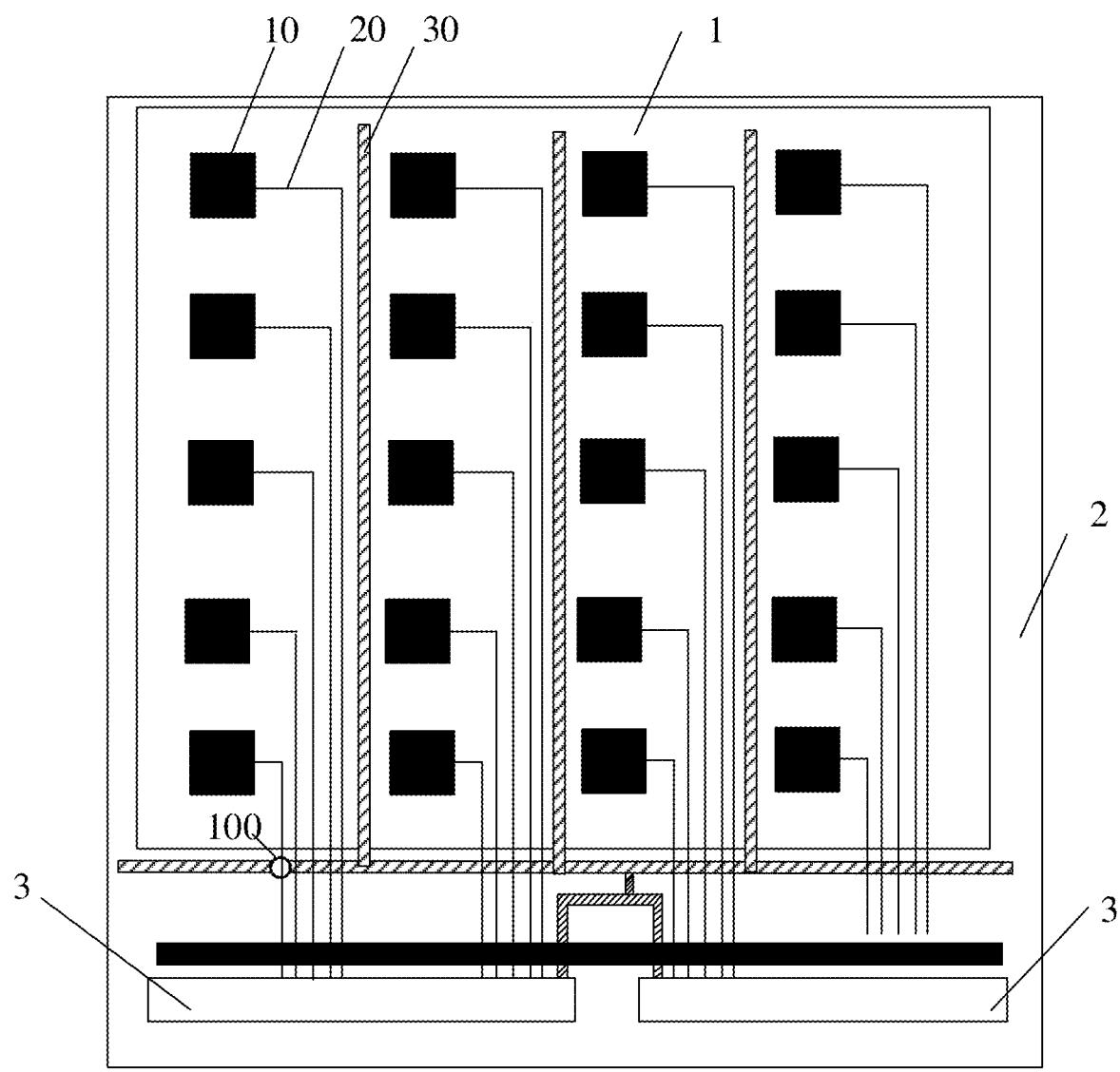
Figure 6C:
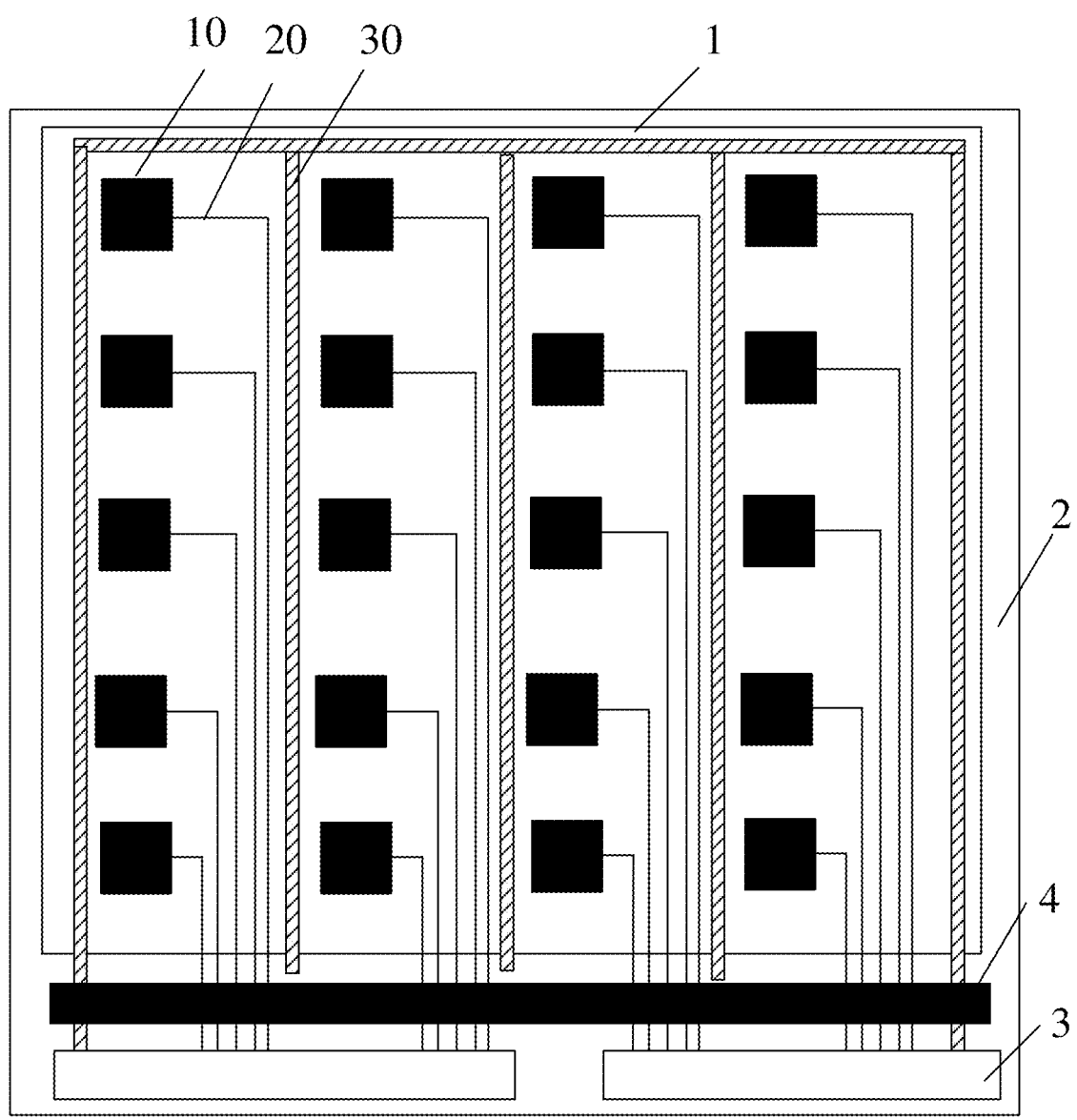
Figure 6D:
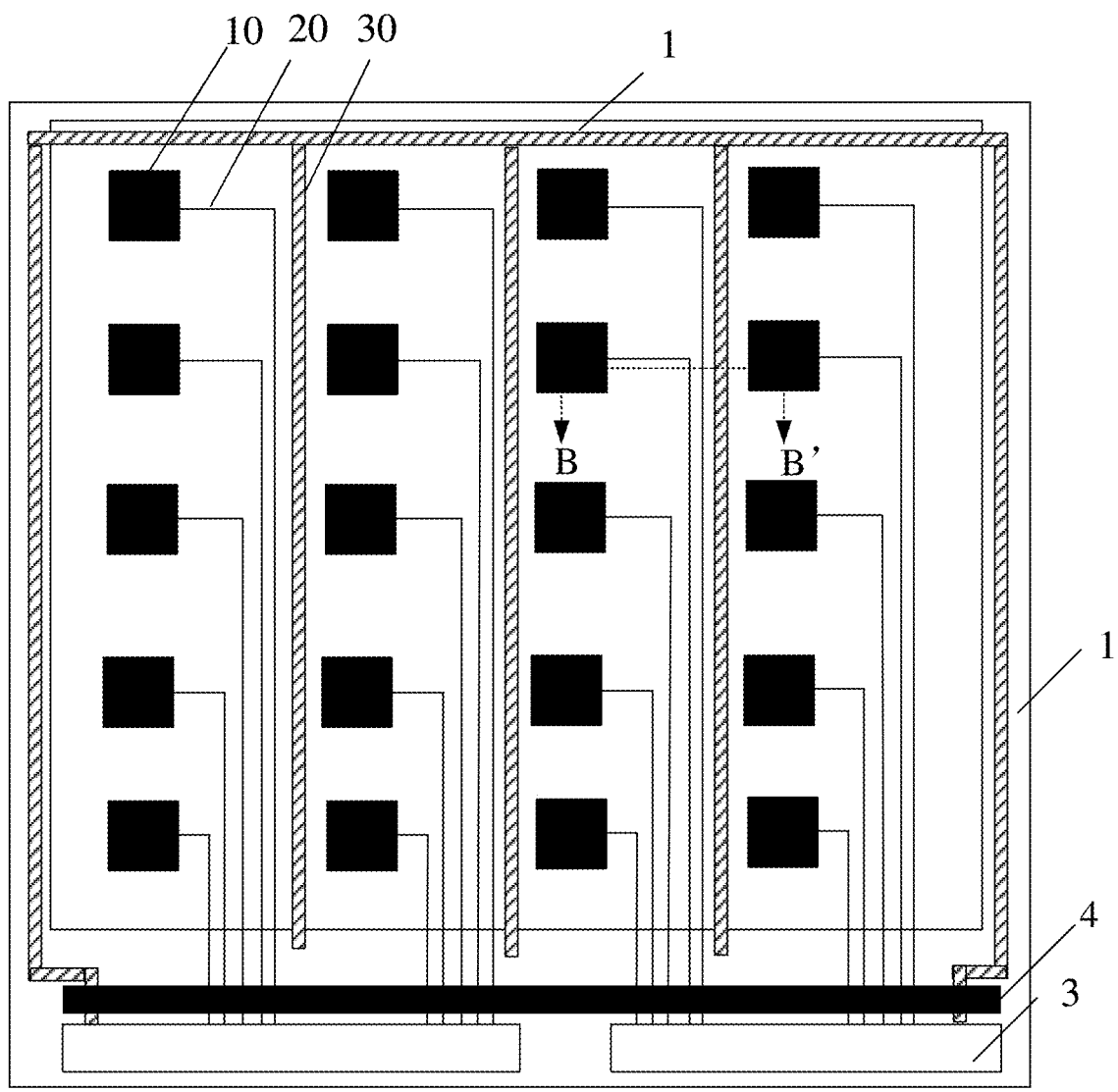

As shown in FIG. 4 or FIG. 5, a third connection way of the signal shielding lines 30 and the touch integrated circuit 3 is: the signal shielding line 30 is also disposed in the touch area 1 close to the peripheral area 2 (FIG. 4) or in the peripheral area 2 (FIG. 5). Each signal shielding line 30 is connected to each other at an end away from the touch integrated circuit 3 and connected to the touch integrated circuit 3 through the signal shielding line 30 located at an edge of the touch area 1 or in the peripheral area 2.

Specifically, as shown in FIG. 4 or FIG. 5, if the plurality of signal shielding lines 30 are connected to each other at the end away from the touch integrated circuit 3, they will not cross the touch signal lines 20. Two outermost signal shielding lines 30 can be disposed on an edge of the touch area 1 or the peripheral area 2, the touch integrated circuit 3 can be connected through the two outermost signal shielding lines 30, so that the touch integrated circuit 3 can input driving signals to each touch signal lines 20 through the two outermost signal shielding lines 30. Therefore, the plurality of signal shielding lines 30 can be directly connected to the touch integrated circuit 3 through the two outermost signal shielding lines 30, so that the signal shielding lines 30 can be connected to the touch integrated circuit 3 conveniently and concisely.

It should be noted that, as shown in FIG. 6(a), FIG. 6(b), FIG. 6(c), and FIG. 6(d), the self-capacitance touch panel may also include a bending area 4, and the signal shielding lines 30 is connected to the touch integrated circuit 3 after the bending area 4 is bent.

Specifically, a flexible printed circuit (FPC) board can be disposed in the peripheral area of the display panel, and the touch integrated circuit 3 can be integrated into the flexible printed circuit board, so that the touch integrated circuit 3 is folded to a back of a glass substrate of the display panel through the flexible printed circuit board. Then connecting the touch signal lines 20 and the signal shielding lines 30 to the touch integrated circuit 3 located on a back of the glass substrate of the display panel after the bending area is bent. That is, the signal lines 20 and the signal shielding lines 30 are connected to the touch integrated circuit 3 across the bending area 4, thereby achieving an effect of reducing a frame width of the display panel.

It should be explained that the signal shielding line 30 may be a single-layer shielding line or a multi-layer shielding line.

When the signal shielding line 30 is a single-layer shielding line, the signal shielding line 30 is disposed on a same layer as the touch electrode 10 and the touch signal line 20.

When the signal shielding line 30 is a multi-layer shielding line, two adjacent layers of the multi-layer shielding line are connected by via holes, and one layer of the signal shielding line 30 is disposed in a same layer as the touch signal line 20. Since the multi-layer shielding line is thicker than the single-layer shielding line, on one hand, it can make a shielding effect of the signal shielding line 30 better, and on another hand, it can make a resistance of the signal shielding line 30 smaller, so as to reduce a degree of signal attenuation of the driving signal of the signal shielding line 30 caused by an impedance load, thereby further improving the shielding effect of the shielding line.

It can be understood that a part of the signal shielding line 30 and the touch signal line 20 located in a same layer will not intersect the touch signal line 20. That is, the signal shielding line 30 between a certain column of the touch electrodes 10 and one column of the touch electrodes 10 of two adjacent columns of the touch electrodes 10 is located between the touch signal lines 20 and adjacent columns of the touch electrodes 10.

It should be noted that the signal shielding line 30 can be made of materials with good conductivity, for example, one or a combination of gold, silver, copper, molybdenum, aluminum, and indium tin oxide can be used.

Figure 7:
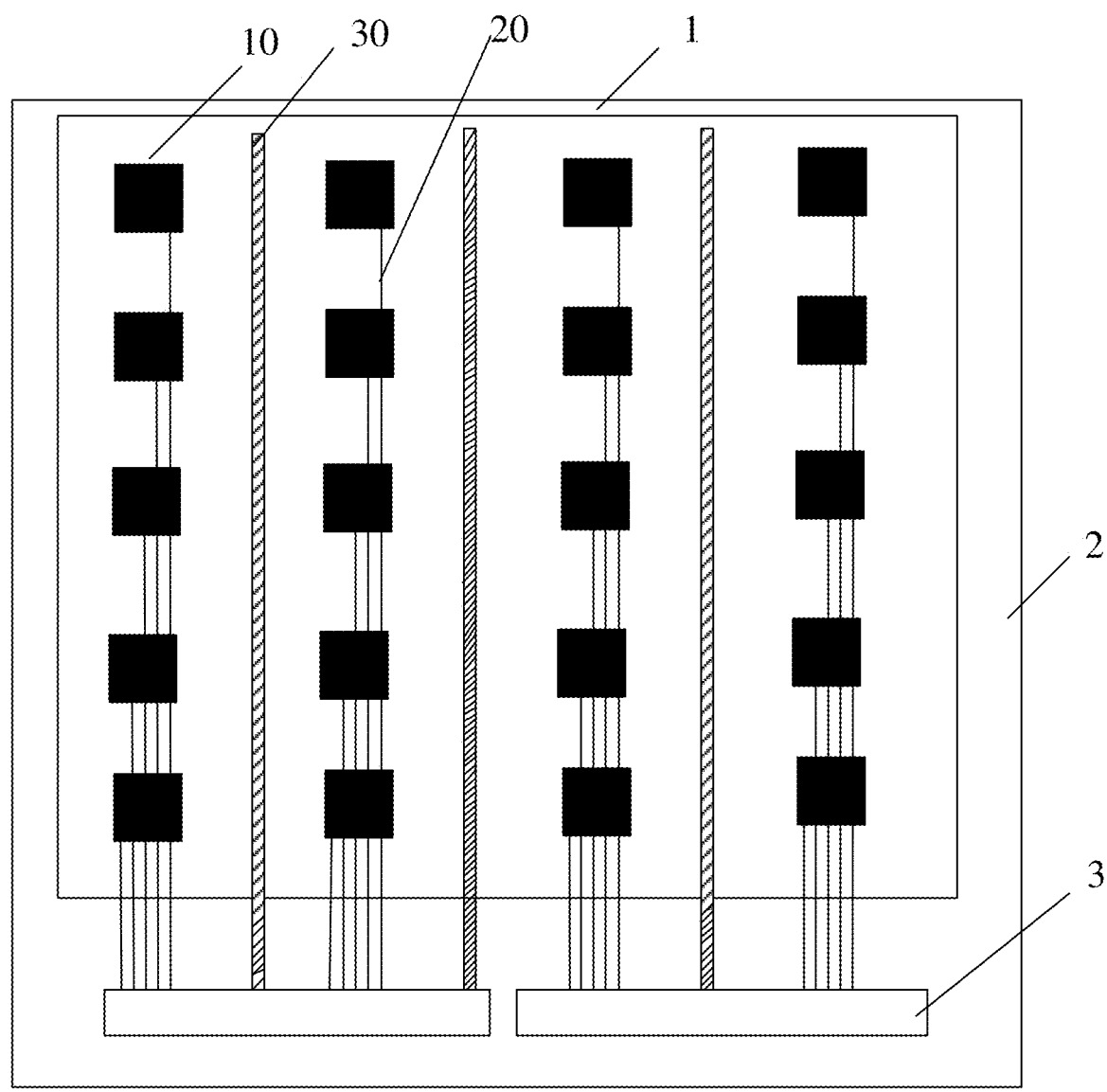
FIG. 7 is another schematic structural diagram of the self-capacitance touch panel provided by the embodiment of the present application.

It should also be noted that the touch electrodes 10 and the touch signal lines 20 can not only be disposed in a same layer as shown in FIG. 1 to FIG. 6(d), but also be disposed in different layers as shown in FIG. 7. When the touch electrodes 10 and the touch signal lines 20 are disposed in different layers, the touch signal lines 20 may not be disposed between every two adjacent columns of the touch electrodes 10, but disposed above the touch electrodes 10, so that the touch signal lines 20 do not need to occupy an area between every two adjacent columns of the touch electrodes 10, and a gap and distance between every two adjacent columns of the touch electrodes 10 can be reduced, thereby more touch electrodes 10 are disposed in the touch area 1 with a limited area, or a limited number of touch electrodes 10 are fabricated in the touch area 1 with a smaller area.

Figure 8A:
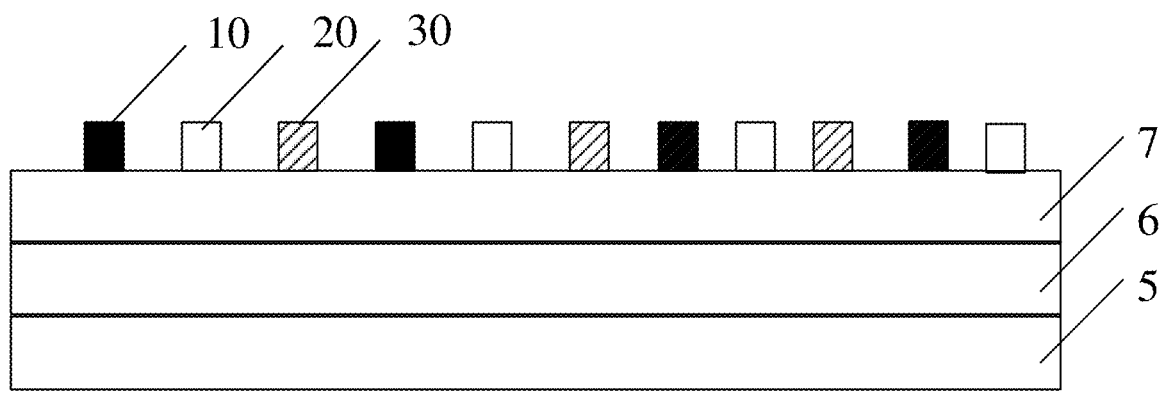
FIG. 8(a) is a first cross-sectional schematic diagram of the self-capacitance touch panel corresponding to FIG. 2.
Figure 8B:
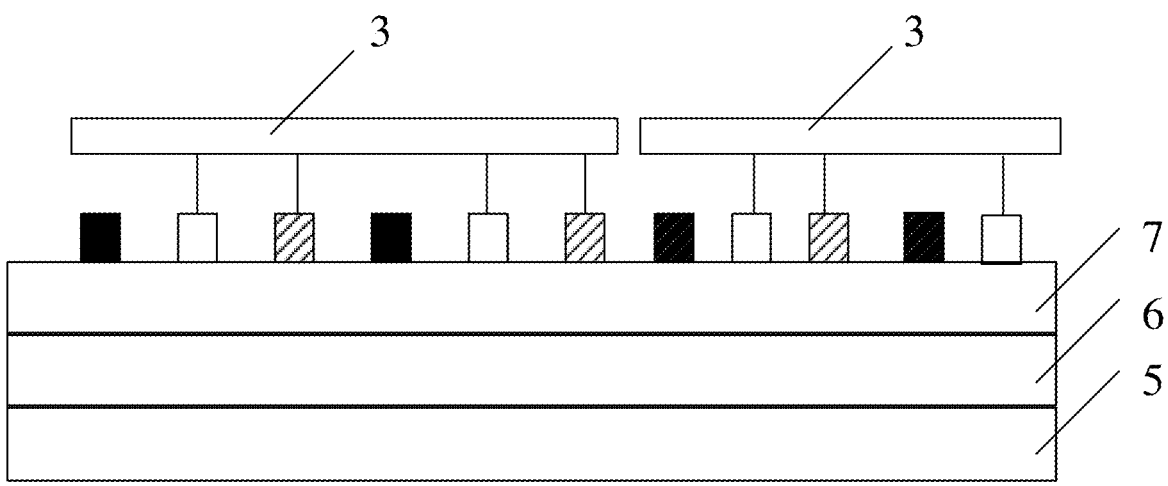
FIG. 8(b) is a cross-sectional schematic diagram of touch signal lines and signal shielding lines in FIG. 8(a) respectively connected to a touch integrated circuit.

Based on the above embodiment, according to a purpose that the touch electrodes 10 and the touch signal lines 20 can be disposed in a same layer or in different layers, and the signal shielding line 30 can be a single-layer shielding line or a multi-layer shielding line, so that the signal shielding line 30 is used to shield the interference of two adjacent columns of the touch electrodes 10 and the touch signal lines 20 connected thereto with the column of touch electrodes 10 being scanned and the touch signal lines 20 connected thereto, the self-capacitance touch panel can form following three specific structures:

FIG. 8(a) shows a cross-sectional schematic diagram of an A-A' section in FIG. 2 where the touch electrodes 10 and the touch signal lines 20 are disposed in a same layer, and the signal shielding lines 30 are single-layer shielding lines. The signal shielding lines 30 are used to shield two adjacent columns of the touch electrodes 10 and the touch signal lines 20 connected thereto from interfering with the column of touch electrodes 10 and the touch signal lines 20 connected thereto. FIG. 8(b) is a cross-sectional schematic diagram of the touch signal lines 20 and the signal shielding lines 30 respectively connected to the touch integrated circuit 3 in the cross-sectional schematic diagram shown in FIG. 8(a).

Figure 9A:
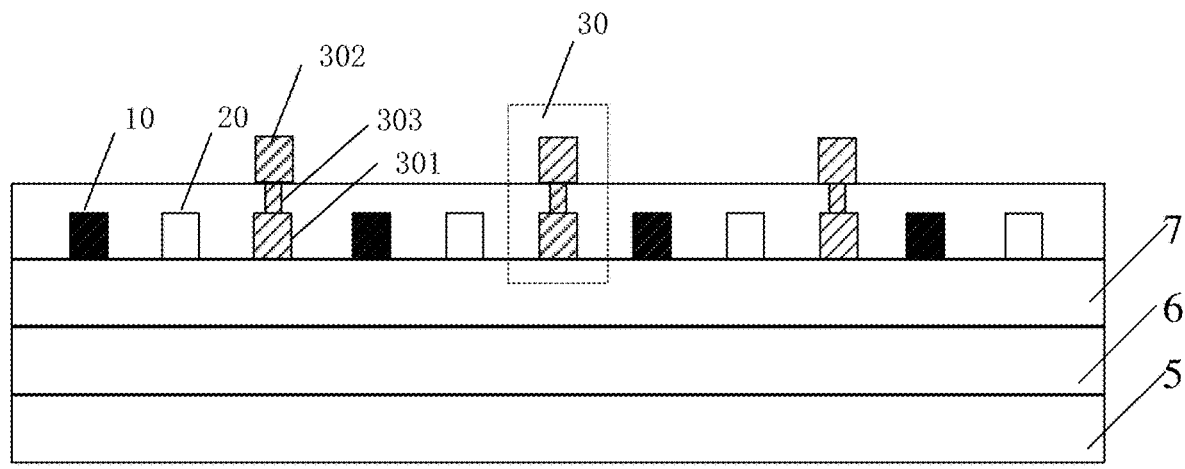
FIG. 9(a) is a second cross-sectional schematic diagram of the self-capacitance touch panel corresponding to FIG. 3 or FIG. 4.
Figure 9B:
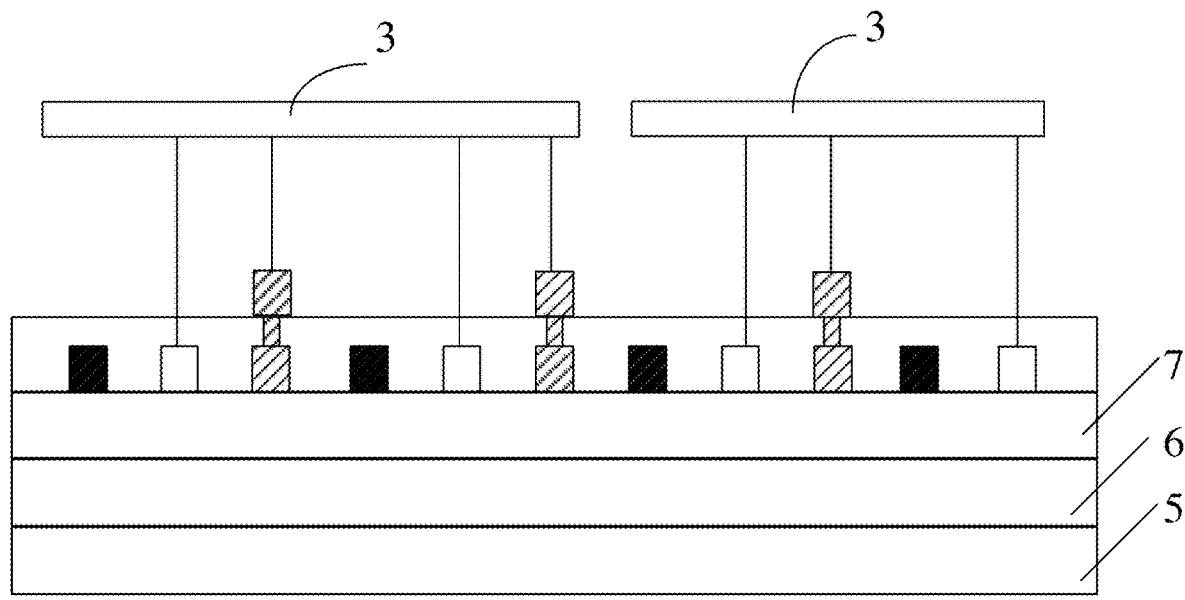
FIG. 9(b) is a s cross-sectional schematic diagram of the touch signal lines and the signal shielding lines in FIG. 9(a) respectively connected to the touch integrated circuit.

FIG. 9(a) shows a cross-sectional schematic diagram of the A-A' section in FIG. 2 where the touch electrodes 10 and the touch signal lines 20 are disposed in a same layer, and the signal shielding lines 30 are double-layer shielding lines. In this case, one layer 301 and another layer 302 of the signal shielding line 30 are connected by a via hole 303, and the one layer 301 and the another layer 302 are used together to shield adjacent two columns of the touch electrodes 10 or the touch signal lines 20 connected to the touch electrodes 10 from interfering with the column of touch electrodes 10 and the touch signal lines 20 connected thereto, so that a double-layer shielding effect is improved compared with a single-layer shielding effect, and an impedance of the signal shielding line 30 is also reduced, which further improves a shielding effect of the shielding line. FIG. 9(b) is a cross-sectional schematic diagram of the touch signal lines 20 and the signal shielding lines 30 respectively connected to the touch integrated circuit 3 in the cross-sectional schematic diagram shown in FIG. 9(a).

Figure 10A:
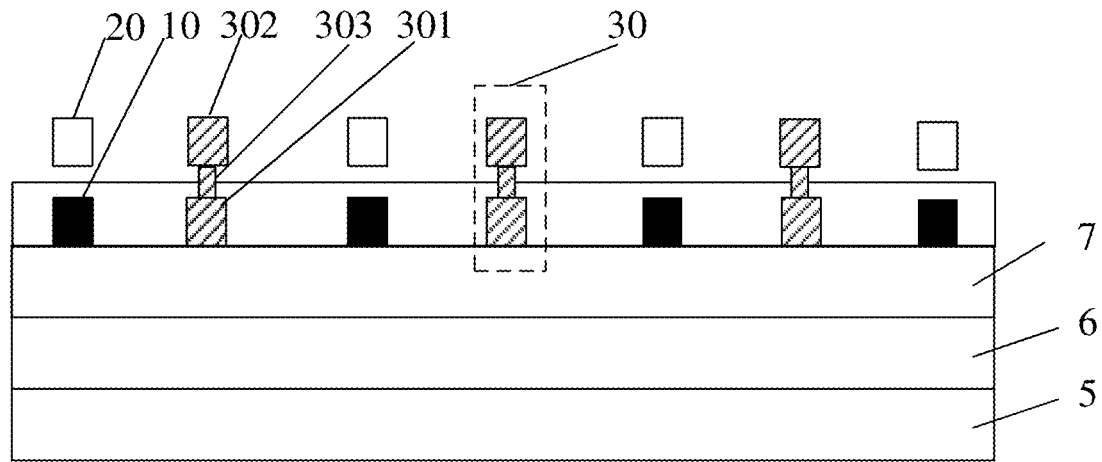
FIG. 10(a) is a third cross-sectional schematic diagram of the self-capacitance touch panel corresponding to FIG. 5.
Figure 10B:
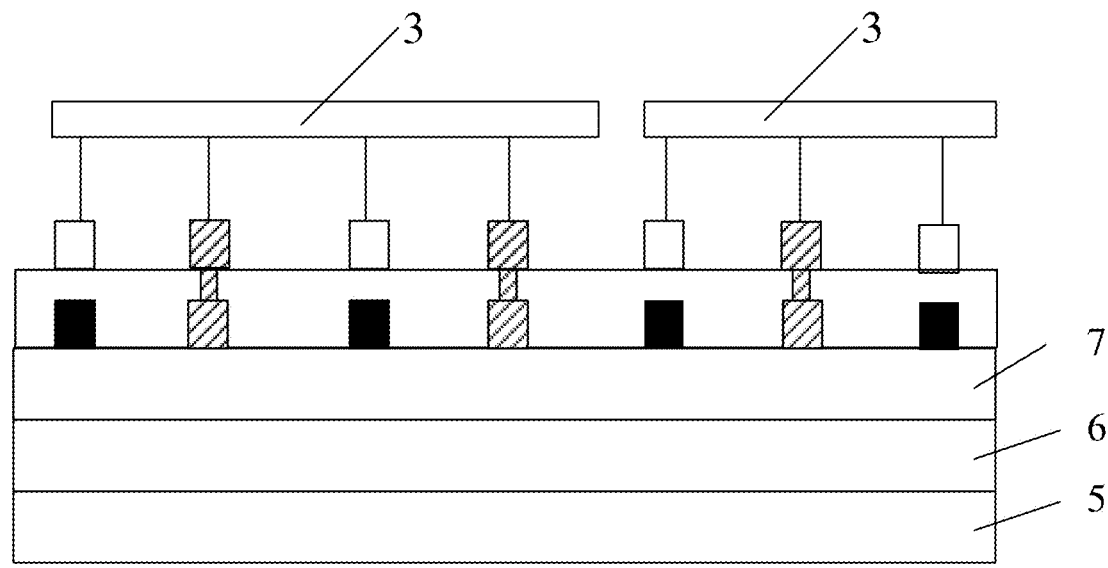
FIG. 10(b) is a cross-sectional schematic diagram of touch signal lines and signal shielding lines in FIG. 10(a) respectively connected to a touch integrated circuit.

FIG. 10(a) shows a cross-sectional schematic diagram of a B-B' section in FIG. 7 where the touch electrodes 10 and the touch signal lines 20 are disposed in different layers, and the signal shielding lines 30 are double-layer shielding lines. In this case, the one layer 301 of the signal shielding line 30 is disposed in a same layer as the touch electrodes 10, and is mainly used to shield an interference of two adjacent columns of the touch electrodes 10 with the column of touch electrodes 10. The another layer 302 of the signal shielding line 30 is disposed on a same layer as the touch signal lines 20, and is mainly used to shield an interference of the touch signal lines 20 connected to two adjacent columns of the touch electrodes 10 with the touch signal lines 20 connected to the column of touch electrodes 10. At a same time, since the one layer 301 and the another layer 302 are connected by the via hole 303, the one layer 301 and the another layer 302 can mutually strengthen a shielding effect of each other, so that the double-layer shielding effect is improved compared with the single-layer shielding effect, and the impedance of the signal shielding line 30 is also reduced, which further improved the shielding effect of the shielding line. FIG. 10(b) is a cross-sectional schematic diagram of the touch signal lines 20 and the signal shielding lines 30 respectively connected to the touch integrated circuit 3 in the cross-sectional schematic diagram shown in FIG. 10(a).

It should be noted that the touch electrode 10, the touch signal line 20, and the signal shielding line 30 are all disposed on a main body of an automatic touch panel. The main body of the panel includes a thin film transistor array 5, an organic light-emitting diode 6, and a package layer 7 from bottom to top. The self-capacitance touch panel can adopt an external touch control way, an on-cell touch way, or an in-cell touch way for touch display.

Specifically, an operating process of the self-capacitance touch panel is: simultaneously inputting a first driving signal to the touch signal lines 20 connected to one of the column of the touch electrodes 10 being scanned through the touch integrated circuit 3, and inputting a second driving signal to at least one signal shielding line 30 adjacent to the column of touch electrodes 10 and collecting the touch signal of the column of touch electrodes 10, wherein a potential difference between the first driving signal and the second driving signal is less than a default threshold.

After the above-mentioned operating process, the self-capacitance touch panel is disposed with the signal shielding lines 30, which are at least partly located in a same layer as the touch signal lines 20, between each column of the touch electrodes 10 and the two adjacent columns of touch electrodes 10 to reduce an interference of each column of the touch electrodes 10 and their connected touch signal lines 20 from the two adjacent columns of touch electrodes 10 and their connected touch signal lines 20, so as to avoid a condition that when scanning the touch electrodes 10 column by column, due to a potential difference existing between one column of the touch electrodes 10 being scanned and two adjacent columns of the touch electrodes 10, the two adjacent columns of the touch electrodes 10 and their connected touch signal lines 20 will cause interference with the column of touch electrodes 10 being scanned and its connected touch signal lines 20, resulting in that a touch monitoring of the column of touch electrodes 10 being scanned is not accurate enough, thereby improving the touch performance of the self-capacitance touch panel.

It can be understood that for those of ordinary skill in the art, equivalent replacements or modifications can be made according to the technical solution of the present application and its inventive concept, and all these modifications or replacements should be protected by the claims attached to the present application.

What is claimed is:

1. A self-capacitance touch panel, comprising a touch area and a peripheral area surrounding the touch area, the peripheral area is disposed with a touch integrated circuit, and the touch area is disposed with touch electrodes arranged in an array, each of the touch electrodes is connected to the touch integrated circuit through a single touch signal line such that the touch integrated circuit sends a first driving signal and receives a touch signal through the single touch signal line; wherein, a plurality of touch signal lines are connected to each column of the touch electrodes, and a signal shielding line is disposed between each two consecutive columns of the touch electrodes and also arranged between two groups of the signal shielding lines connected to these respective two columns of the touch electrodes;

wherein the signal shielding line is connected to the touch integrated circuit, and the touch integrated circuit is configured to input the first driving signal to the touch signal line and input a second driving signal to the signal shielding line, wherein a potential difference between the first driving signal and the second driving signal is less than a default threshold;

wherein each signal shielding line is a multilayer shielding line, and two adjacent layers within each multilayer shielding line are connected by via holes;

wherein the touch electrodes and the touch signal lines are disposed in a same layer, and one layer of the signal shielding lines is disposed in the same layer as the touch electrodes and the touch signal lines; or alternatively, the touch electrodes and the touch signal lines are arranged in different layers, and one layer of the signal shielding line is disposed in a same layer as the touch electrodes, and another layer of the signal shielding line is disposed in a same layer as the touch signal lines;

wherein in a column-by-column scanning mode, the touch electrodes are scanned column by column, when each column of the touch electrodes is scanned, the first driving signal is input to the touch signal lines connected to this column of the touch electrodes, and the second driving signal is synchronously input to two consecutive ones of the signal shielding lines disposed adjacent to this column of the touch electrodes and sandwiching the same;

when the potential difference between the first driving signal and the second driving signal is zero, in the column-by-column scanning mode, touch signals are scanned for each column of the touch electrodes without interference from the adjacent columns of the touch electrodes caused by potential difference between the first driving signal and the second driving signal electrodes.

2. The self-capacitance touch panel of claim 1, wherein the potential difference between the first driving signal and the second driving signal is zero.

3. The self-capacitance touch panel of claim 2, wherein a plurality of the signal shielding lines are connected to each other at one end close to the touch integrated circuit and are connected to the touch integrated circuit through leads located in the peripheral area, wherein the signal shielding lines are connected by changing wires at an intersection with the touch signal line.

4. The self-capacitance touch panel of claim 2, wherein the signal shielding line is also disposed in the peripheral area or in the touch area close to the peripheral area, the plurality of signal shielding lines are connected to each other at one end away from the touch integrated circuit, and the signal shielding line disposed in the peripheral area or in the touch area close to the peripheral area is connected to the touch integrated circuit.

5. The self-capacitance touch panel of claim 1, wherein the peripheral area further comprises a bending area, and the signal shielding line is connected to the touch integrated circuit after the bending area is bent.

6. The self-capacitance touch panel of claim 1, wherein the signal shielding line is made of one or a combination of gold, silver, copper, molybdenum, aluminum, and indium tin oxide.

7. A self-capacitance touch panel, comprising a touch area and a peripheral area surrounding the touch area, the peripheral area is disposed with a touch integrated circuit, and the touch area is disposed with touch electrodes arranged in an array, each of the touch electrodes is connected to the touch integrated circuit through a single touch signal line such that the touch integrated circuit sends a first driving signal and receives a touch signal through the single touch signal line; wherein a plurality of touch signal lines are connected to each column of the touch electrodes, and a signal shielding line is disposed between each two consecutive columns of the touch electrodes and also arranged between two groups of the signal shielding lines connected to these respective two columns of the touch electrodes;

the signal shielding line is connected to the touch integrated circuit, and the touch integrated circuit is configured to input the first driving signal to the touch signal line and input a second driving signal to the signal shielding line, wherein a potential difference between the first driving signal and the second driving signal is zero;

wherein each signal shielding line is a multilayer shielding line, and two adjacent layers within each multilayer shielding line are connected by via holes;

wherein the touch electrodes and the touch signal lines are disposed in a same layer, and one layer of the signal shielding lines is disposed in the same layer as the touch electrodes and the touch signal lines; or alternatively, the touch electrodes and the touch signal lines are arranged in different layers, and one layer of the signal shielding line is disposed in a same layer as the touch electrodes, and another layer of the signal shielding line is disposed in a same layer as the touch signal lines;

wherein in a column-by-column scanning mode, the touch electrodes are scanned column by column, when each column of the touch electrodes is scanned, the first driving signal is input to the touch signal lines connected to this column of the touch electrodes, and the second driving signal is synchronously input to two consecutive ones of the signal shielding lines disposed adjacent to this column of the touch electrodes and sandwiching the same;

when in the column-by-column scanning mode, touch signals are scanned for each column of the touch electrodes without interference from the adjacent columns of the touch electrodes caused by potential difference between the first driving signal and the second driving signal electrodes.

8. The self-capacitance touch panel of claim 7, wherein a plurality of the signal shielding lines are connected to each other at one end close to the touch integrated circuit and are connected to the touch integrated circuit through leads located in the peripheral area, wherein the signal shielding lines are connected by changing wires at an intersection with the touch signal line.

9. The self-capacitance touch panel of claim 7, wherein the signal shielding line is also disposed in the peripheral area or in the touch area close to the peripheral area, the plurality of signal shielding lines are connected to each other at one end away from the touch integrated circuit, and the signal shielding line disposed in the peripheral area or in the touch area close to the peripheral area is connected to the touch integrated circuit.

10. The self-capacitance touch panel of claim 7, wherein the peripheral area further comprises a bending area, and the signal shielding line is connected to the touch integrated circuit after the bending area is bent.

11. The self-capacitance touch panel of claim 7, wherein the signal shielding line is made of one or a combination of gold, silver, copper, molybdenum, aluminum, and indium tin oxide.

* * * * *